(12) United States Patent
Miyairi

(10) Patent No.: US 9,061,942 B2
(45) Date of Patent: Jun. 23, 2015

(54) EXHAUST GAS PURIFICATION FILTER

(75) Inventor: Yukio Miyairi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 13/469,235

(22) Filed: May 11, 2012

(65) Prior Publication Data
US 2012/0317945 A1 Dec. 20, 2012

(30) Foreign Application Priority Data

Jun. 17, 2011 (JP) ................... 2011-135457

(51) Int. Cl.
| | |
|---|---|
| *B01D 50/00* | (2006.01) |
| *B01D 39/14* | (2006.01) |
| *B01D 39/20* | (2006.01) |
| *B01D 39/06* | (2006.01) |
| *B01D 24/00* | (2006.01) |
| *C04B 38/00* | (2006.01) |
| *B01D 46/24* | (2006.01) |
| *C04B 111/00* | (2006.01) |

(52) U.S. Cl.
CPC ........ *C04B 38/0009* (2013.01); *B01D 46/2429* (2013.01); *B01D 2046/2433* (2013.01); *B01D 2046/2437* (2013.01); *B01D 2046/2496* (2013.01); *C04B 2111/00793* (2013.01)

(58) Field of Classification Search
CPC ............ C04B 38/0074; C04B 38/0006; C04B 38/195; C04B 38/0054; F01N 3/0222; F01N 3/035; F01N 2330/06
USPC ............. 55/522–524; 422/169–172, 177–182
See application file for complete search history.

(56) References Cited

U.S. PATENT DOCUMENTS

| | | | | |
|---|---|---|---|---|
| 4,632,683 | A * | 12/1986 | Fukutani et al. | 55/523 |
| 6,827,754 | B2 * | 12/2004 | Suwabe et al. | 55/523 |
| 2002/0189217 | A1 * | 12/2002 | Ishihara et al. | 55/523 |
| 2003/0024219 | A1 * | 2/2003 | Harada et al. | 55/523 |
| 2004/0261384 | A1 * | 12/2004 | Merkel et al. | 55/523 |
| 2005/0102987 | A1 * | 5/2005 | Kudo | 55/523 |
| 2006/0068159 | A1 | 3/2006 | Komori et al. | |
| 2006/0093784 | A1 | 5/2006 | Komori et al. | |
| 2007/0269352 | A1 | 11/2007 | Miyairi et al. | |

(Continued)

FOREIGN PATENT DOCUMENTS

| | | |
|---|---|---|
| EP | 1 842 578 A2 | 10/2007 |
| EP | 2 236 189 A1 | 10/2010 |

(Continued)

OTHER PUBLICATIONS

Extended European Search Report dated Jan. 10, 2013.

*Primary Examiner* — Amber Orlando
(74) *Attorney, Agent, or Firm* — Burr & Brown, PLLC

(57) ABSTRACT

An exhaust gas purification filter includes a honeycomb structure having porous ceramic partition walls separating and forming a plurality of cells functioning as exhaust gas passages and extending from one end portion to the other end portion, and plugging portions disposed in one side open end portions of predetermined cells and in the other side open end portions of the other cells. The partition walls have a thickness of 0.05 mm or more and 0.18 mm or less and an average pore size of 10 μm or more and 18 μm or less and the proportion of the volume of the pores having a size of twice the average pore size or more in the entire pore volume in a pore size distribution of the partition walls measured by mercury porosimetry is 5% or more and 40% or less.

17 Claims, 2 Drawing Sheets

(56) References Cited

U.S. PATENT DOCUMENTS

| | | | |
|---|---|---|---|
| 2009/0205301 A1* | 8/2009 | Komori et al. | 55/385.1 |
| 2009/0239029 A1 | 9/2009 | Yamaguchi | |
| 2010/0205921 A1 | 8/2010 | Okazaki et al. | |
| 2010/0239478 A1 | 9/2010 | Arnold et al. | |
| 2010/0247406 A1 | 9/2010 | Ohno et al. | |
| 2011/0085940 A1* | 4/2011 | Ogyu et al. | 422/180 |
| 2011/0158871 A1 | 6/2011 | Arnold et al. | |
| 2012/0031062 A1 | 2/2012 | Komori et al. | |
| 2012/0097033 A1 | 4/2012 | Arnold et al. | |
| 2012/0107203 A1 | 5/2012 | Arnold et al. | |
| 2013/0330259 A1 | 12/2013 | Arnold et al. | |
| 2014/0186228 A1 | 7/2014 | Arnold et al. | |

FOREIGN PATENT DOCUMENTS

| | | |
|---|---|---|
| EP | 2 239 037 A1 | 10/2010 |
| EP | 2 319 603 A1 | 5/2011 |
| JP | 2002-121084 A | 4/2002 |
| JP | 3272746 B2 | 4/2002 |
| JP | 2007-296514 A | 11/2007 |
| JP | 2009-257321 A | 11/2009 |
| JP | 2010-221155 A | 10/2010 |
| WO | 2004/113252 A1 | 12/2004 |
| WO | 2005/002709 A1 | 1/2005 |
| WO | 2009/048156 A1 | 4/2009 |
| WO | 2010/097634 A1 | 9/2010 |

* cited by examiner

EXHAUST GAS PURIFICATION FILTER

BACKGROUND OF THE INVENTION

The present invention relates to an exhaust gas purification filter. More specifically, the present invention relates to an exhaust gas purification filter suitably used for removing particulate matter contained in exhaust gas discharged from an engine.

In recent years, there has been demanded reduction in fuel consumption of an automobile from the viewpoints of influences on the global environment and resource saving. Therefore, internal combustion engines having good thermal efficiency, such as a diesel engine and a direct gasoline-injection engine tend to be used as a powder source for an automobile.

On the other hand, in these internal combustion engines, soot generation upon combustion is a problem. There is required a countermeasure to inhibit particulate matter such as the aforementioned soot from being released from the viewpoint of the air environment.

As a measure for inhibiting the aforementioned particulate matter from being released in the air, there has been proposed removal of the particulate matter in the exhaust gas by the use of an exhaust gas purification filter. As an example of the exhaust gas purification filter, there is a wall flow type exhaust gas purification filter provided with a honeycomb structure and plugging portions. The honeycomb structure has porous partition walls separating and forming a plurality of cells functioning as exhaust gas passages and extending from one end portion to the other end portion. The plugging portions are disposed so as to alternately plug the one side end portions and the other side end portions of the cells of the aforementioned honeycomb structure.

In such an exhaust gas purification filter, when exhaust gas is allowed to flow into the cells having open end portions on one side of the honeycomb structure, particulate matter in the exhaust gas is trapped by the partition walls when the exhaust gas passes through the partition walls. Then, the purified gas from which the particulate matter is removed flows out from the cells having open end portions on the other side.

However, in the case of disposing such an exhaust gas purification filter in an exhaust system of an engine of an internal combustion engine or the like, increase of pressure loss in the exhaust system is caused. As a result, the decrease of engine output may exceed the allowable range as the engine.

In addition, in a conventional diesel engine filter having a very high discharge concentration of particulate matter in exhaust gas, the particulate matter in the exhaust gas is deposited in layers on the surface of the partition walls of the honeycomb structure constituting the exhaust gas purification filter. The aforementioned "layers of the particulate matter" function as a trapping filter. Hereinbelow, particulate matter may be referred to as "PM" or "particulates". In addition, the "layers of the particulate matter" may be referred to as "PM layers". Therefore, in a conventional diesel engine filter, high trapping efficiency of the particulate matter can be maintained. On the other hand, in the case that the concentration of particulate matter in exhaust gas is decreased in comparison with a conventional diesel engine by improvement in combustion in a diesel engine, the formation of the aforementioned PM layers can not be expected, and the trapping efficiency of the exhaust gas purification filter cannot be maintained sufficiently. That is, a conventional diesel engine exhaust gas purification filter is produced on the assumption that the concentration of particulate matter in exhaust gas is high. Therefore, when the concentration of particulate matter in exhaust gas is decreased due to the combustion improvement in a diesel engine itself, it is difficult to sufficiently remove particulate matter by a conventional exhaust gas purification filter even if the amount of the particulate matter is small.

Even in a direct gasoline-injection engine, which has a small amount of particulate matter in comparison with a diesel engine, it is becoming necessary to purify exhaust gas by an exhaust gas purification filter for trapping particulate matter. Even in such an exhaust gas purification filter, formation of the PM layers is not expected like the aforementioned diesel engine having the combustion improved, and the trapping efficiency of the exhaust gas purification filter cannot sufficiently be maintained. In addition, also in a natural gas compression ignition type engine or the like, it has a problem similar to that of the aforementioned direct gasoline-injection engine.

Thus, the direct gasoline-injection engine, the natural gas compression ignition type engine, and advanced technological diesel engine (e.g., diesel engine having improved combustion) has a small amount of particulate matter in exhaust gas in comparison with a conventional general diesel engine. Therefore, in the direct gasoline-injection engine or the like, the absolute amount of particulate matter which should be trapped by an exhaust gas purification filter is small. However, in a conventional exhaust gas purification filter, the exhaust gas discharged from the aforementioned direct gasoline-injection engine or the like cannot be purified sufficiently.

In addition, in order to improve particulate matter-trapping efficiency, it can be considered to reduce the pore size of the partition walls of the honeycomb structure. However, in the case of simply reducing the pore size of the partition walls, the pressure loss of the exhaust gas purification filter is increased.

As a means to solve the trade-off problem of raising the trapping efficiency of the particulate matter and suppressing the pressure loss when the particulate matter deposits on the partition walls, the following technique has been proposed. That is, in an exhaust gas purification filter for a conventional diesel engine having a very high particulate matter discharge concentration, a technique of sharpening the pore size distribution of the partition wall has been proposed (see Japanese Patent No. 3272746).

In a conventional diesel engine, since the amount of particulate matter in exhaust gas discharged from the engine is large, the required trapping efficiency of a filter necessary to clear the exhaust gas regulation is set to a high level. For example, in the case of the exhaust gas regulation depending on the number of particulates in exhaust gas, the required trapping efficiency of the filter is 99% or more.

In contrast, in a direct gasoline-injection engine and a natural gas compression ignition type engine (i.e., engines having a reduced particulate matter amount), the amount of particulate matter in exhaust gas discharged from the engine is small in comparison with a conventional diesel engine. Therefore, in a filter used for such an engine, the required trapping efficiency is set to be low in comparison with the case of the aforementioned diesel engine. For example, in the case of an engine having a reduced particulate matter amount, the required trapping efficiency of the filter is about 70%.

As described above, there is a difference in the required trapping efficiency between an exhaust gas purification filter used for an engine having a reduced particulate matter amount and the exhaust gas purification filter developed for a conventional diesel engine (e.g., a conventional diesel particulate filter). Therefore, there is a difference in the configuration of the filter for performing good purification between an exhaust gas purification filter used for an engine having a reduced particulate matter amount and a conventional diesel particulate filter. For example, the best pore size diameter of the partition wall from the viewpoint of satisfying both the reduction in pressure loss and the improvement in trapping efficiency is different between a conventional diesel engine filter and a filter for an engine having a reduced particulate matter amount. Therefore, there is a problem of impossible application of the technique described in Japanese Patent No. 3272746, which is most suitable for a conventional diesel engine, as it is to an engine having a reduced particulate matter amount.

In a diesel engine having a small amount of particulate matter, particulate matter such as soot is oxidized by the high temperature exhaust gas discharged from the engine and the nitrogen oxide (NOx) contained in the exhaust gas, thereby removing the particulate matter in the exhaust gas. Examples of the diesel engine having a small amount of particulate matter include a direct gasoline-injection engine, a natural gas compression ignition type engine, and an advanced diesel engine adopting measures such as raising the fuel injection pressure or reducing the diameter of a fuel injection nozzle hole. Therefore, in an exhaust gas purification filter used for such an engine, it is important to reduce the pressure loss in a state that no particulate matter deposits on the partition walls. This point is also different from a conventional diesel engine filter, and it is suitably used for an engine having a smaller amount of particulate matter. There is a demand for a development of an exhaust gas purification filter having low pressure loss and appropriate purification performance.

SUMMARY OF THE INVENTION

The present invention has been made in view of the prior art problems and aims to provide an exhaust gas purification filter capable of being suitably used for an engine, particularly, an engine having a reduced amount of particulate matter contained in exhaust gas and capable of appropriately removing particulate matter in exhaust gas with suppressing the rise in pressure loss.

As a result of earnest studies to solve the aforementioned problems, the present inventor found out that an exhaust gas purification filter configured as described below enables to suppress the rise in pressure loss while satisfying the required trapping efficiency, which has lead to the completion of the present invention. That is, in an exhaust gas purification filter for an engine having less particulate matter in exhaust gas than a conventional diesel engine and having a low required trapping efficiency, it is effective not to sharpen the pore size distribution of the partition walls as described in Japanese Patent No. 3272746, but to broaden the pore size distribution, in reverse. Further, it is effective to specify the thickness and the average pore size of the partition walls in predetermined ranges. According to the present invention, there is provided an exhaust gas purification filter shown below.

According to a first aspect of the present invention, an exhaust gas purification filter is provided comprising a honeycomb structure having porous ceramic partition walls separating and forming a plurality of cells functioning as exhaust gas passages and extending from one end portion to the other end portion, and plugging portions disposed in one side open end portions of predetermined cells and in the other side open end portions of the other cells, wherein the partition walls have a thickness of 0.05 mm or more and 0.18 mm or less, the partition walls have an average pore size of 10 μm or more and 18 μm or less, which is measured by mercury porosimetry, and the proportion of the volume of the pores having a size of twice the average pore size or more in the entire pore volume in a pore size distribution of the partition walls measured by mercury porosimetry is 5% or more and 40% or less.

According to a second aspect, the exhaust gas purification filter according to the first aspect is provided, where the pore size distribution shows a distribution curve having a single peak.

According to a third aspect, the exhaust gas purification filter according to the first or second aspects is provided, which is a filter for purifying exhaust gas discharged from an automobile engine and used for an engine having an exhaust gas particulate discharge amount of $2 \times 10^{12}$ particulates/km or less in European NEDC regulation mode driving.

According to the fourth aspect, the exhaust gas purification filter according to any one of the first to third aspects is provided, wherein the honeycomb structure has a cell density of 13 cells/$cm^2$ or more and 70 cells/$cm^2$ or less.

According to a fifth aspect, the exhaust gas purification filter according to any one of the first to fourth aspects is provided, wherein the plugging portions have a length of 1 mm or more and 7 mm or less in a cell extension direction.

An exhaust gas purification filter of the present invention is provided with a honeycomb structure having porous partition walls and plugging portions disposed in one side open end portions of predetermined cells and in the other side open end portions of the other cells. In an exhaust gas purification filter of the present invention, the partition walls have a thickness of 0.05 mm or more and 0.18 mm or less and an average pore size of 10 μm or more and 18 μm or less, which is measured by mercury porosimetry. Further, in an exhaust gas purification filter of the present invention, the proportion of the volume of the pores having a size of twice the average pore size or more in the entire pore volume in a pore size distribution of the partition walls measured by mercury porosimetry is 5% or more and 40% or less. By thus specifying the proportion of the volume of the pores having a size of twice the average pore size or more in the entire pore volume in the average pore size distribution of the partition walls (i.e., 5% or more and 40% or less), the pore size distribution of the partition walls is broadened in comparison with the pore size distribution of the partition walls in a conventional diesel engine filter. In addition, in an exhaust gas purification filter of the present invention, the thickness of the partition walls is reduced (i.e., 0.05 mm or more and 0.18 mm or less) in comparison with a conventional diesel engine filter, and the average pore size measured by mercury porosimetry is in a specific range (i.e., 10 μm or more and 18 μm or less). By such a shape of a pore size distribution, partition wall thickness, and average pore size, effects of them are combined to be able to remove particulate matter in exhaust gas in a good manner while suppressing the rise in pressure loss in an engine having a reduced amount of particulate matter contained in exhaust gas.

REFERENCE NUMERALS USED IN THE DRAWINGS

10: honeycomb structure; 11, 11a, 11b: cell; 12: partition wall; 13, 13a, 13b: plugging portion; 15a: end portion on one side; 15b: end portion on the other side; 100: exhaust gas purification filter.

DETAILED DESCRIPTION OF THE INVENTION

Hereinbelow, embodiments of the present invention will be described. However, the present invention is by no means limited to the following embodiments, and it should be understood that embodiments obtained by adding a change, an improvement, or the like to the following embodiments on the basis of ordinary knowledge of a person of ordinary skill in the art within a range of not deviating from the gist of the present invention are included in the scope of the present invention.

Figure 1:
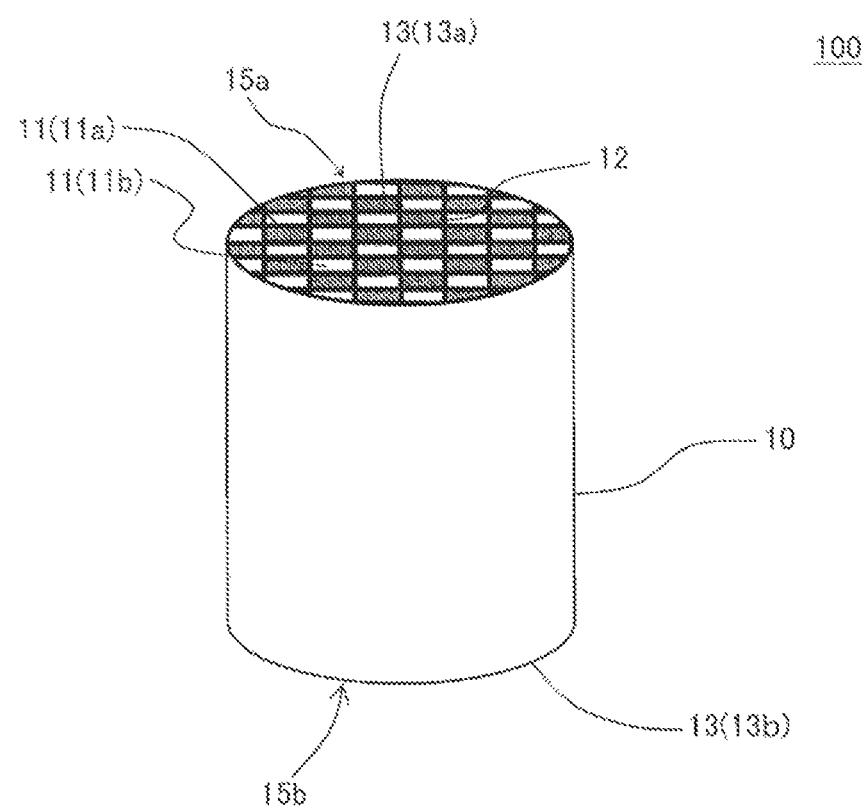
FIG. 1 is a perspective view schematically showing an embodiment of an exhaust gas purification filter of the present invention.

[1] Exhaust Gas Purification Filter:

An embodiment of an exhaust gas purification filter of the present invention will be described with referring to the drawings. Here, FIG. 1 is a perspective view schematically showing an embodiment of an exhaust gas purification filter of the present invention. As shown in FIG. 1, the exhaust gas purification filter 100 of the present embodiment is an exhaust gas purification filter 100 provided with a honeycomb structure 10 and plugging portions 13 (13a, 13b). The honeycomb structure has porous ceramic partition walls 12 separating and forming a plurality of cells 11 functioning as exhaust gas passages and extending from one side end portion 15a to the other side end portion 15b. The plugging portions 13 (13a, 13b) are disposed in one side open end portions of predetermined cells 11a and the other side open end portions of the other cells 11b. The exhaust gas purification filter 100 of the present embodiment is an exhaust gas purification filter suitably used for removing particulate matter in exhaust gas discharged from an engine having a small amount of particulate matter. Examples of the engines having a small particulate matter amount include a direct gasoline-injection engine, a natural gas compression ignition type engine, and an advanced diesel engine adopting measures such as raising the fuel injection pressure or reducing the diameter of a fuel injection nozzle hole.

In the exhaust gas purification filter 100 of the present embodiment, the thickness of the partition walls 12 of the honeycomb structure 10 is 0.05 mm or more and 0.18 mm or less. In the exhaust gas purification filter 100 of the present embodiment, the average pore size of the partition walls 12 is 10 μm or more and 18 μm or less, which is measured by mercury porosimetry. Further, in the exhaust gas purification filter 100 of the present embodiment, the proportion of the volume of the pores having a size of twice the average pore size or more in the entire pore volume in a pore size distribution of the partition walls measured by mercury porosimetry is 5% or more and 40% or less.

Thus, in the exhaust gas purification filter 100 of the present embodiment, the proportion of the volume of the pores having a size of twice the average pore size or more in the entire pore volume in a pore size distribution of the partition walls 12 measured by mercury porosimetry is specified to 5% or more and 40% or less. This makes the pore size distribution of the partition walls 12 broader than the pore size distribution of the partition walls in a filter for a conventional diesel engine. That is, in the exhaust gas purification filter 100 of the present embodiment, the shape of the pore size distribution of the partition walls measured by mercury porosimetry is specified by the "proportion of the volume of the pores having a size of twice the average pore size or more in the entire pore volume in a pore size distribution". Hereinbelow, the "proportion of the volume of the pores having a size of twice the average pore size or more in the entire pore volume in a pore size distribution" may be referred to as the "proportion of twice the average pore diameter".

In the exhaust gas purification filter 100 of the present embodiment, the thickness of the partition walls 12 (hereinbelow sometimes referred to as the "partition wall thickness") was reduced in comparison with the conventional diesel engine filter, and the average pore size measured by mercury porosimetry is specified to a certain range. The partition wall thickness is 0.05 mm or more and 0.18 mm or less. The average pore size is 10 μm or more and 18 μm or less.

By such a shape of a pore size distribution, partition wall thickness, and average pore size, effects of them are combined to be able to exhibit the following effects. That is, in an engine having a reduced amount of particulate matter contained in exhaust gas, the particulate matter in exhaust gas discharged from the engine can be removed in a good manner while suppressing the rise in pressure loss. That is, the exhaust gas purification filter 100 of the present embodiment is for treating (purifying) exhaust gas discharged from an engine having a small amount of particulate matter. It has been developed to match the exhaust gas regulation in such an engine while suppressing pressure loss in the exhaust system of the engine as much as possible.

Therefore, the shape of a pore size distribution, partition wall thickness, and average pore size mutually relate to one another, and the effect due to each of the constituents is exhibited on the premise that other constituents are fulfilled. In other words, in the case that one of the aforementioned shape of a pore size distribution, partition wall thickness, and average pore size does not fulfill the value range, the effects due to the other constituents are not exhibited sufficiently. For example, in an exhaust gas purification filter developed for a conventional diesel engine, it can be assumed that there is a case of fulfilling one of the constituents of the aforementioned shape of a pore size distribution, partition wall thickness, and average pore size. However, in an exhaust gas purification filter for a conventional diesel engine, the contents of the target exhaust gas regulations (e.g., exhaust gas regulation by the number of particulates in exhaust gas) are completely different, and a filter fulfilling the aforementioned three conditions at the same time has never been developed. In particular, the exhaust gas purification filter of the present embodiment is not for simply raising the trapping efficiency, but for realizing an appropriate trapping efficiency according to the target exhaust gas regulation.

By specifying the proportion of pores having a size of twice the average pore size or more to 5% or more, the shape of the pore size distribution becomes broad. That is, when the proportion is below 5%, the bottom of a peak of the pore size distribution becomes narrow, and the shape of the pore size distribution becomes sharp. In the case that the amount of the particulate matter in exhaust gas is large as in a conventional diesel engine, since the required trapping efficiency of the filter for clearing the exhaust gas regulation is set to a high level, a sharp pore size distribution of the partition wall has been considered to be appropriate. However, in the case of an engine having a reduced particulate matter amount, the required trapping efficiency of a filter is set to a lower level, and a drawback of increasing in pressure loss by sharpening the shape of the pore size distribution increases more than the advantageous effect of improving the required trapping efficiency.

On the other hand, by specifying the proportion of the pores having a size of twice the average pore size or more to be 40% or less, the shape of the pore size distribution can be inhibited from being extremely broad. That is, in the exhaust gas purification filter of the present embodiment, the average pore size of the partition walls is 10 μm or more and 18 μm or less, which is measured by mercury porosimetry. Therefore, in the case that the proportion of the pores having a size of twice the average pore size or more is above 40%, pores having a size of about the average pore size specified in the present embodiment are relatively decreased, and pores having larger pore sizes increase. Though the pores having large pore sizes can increase the permeability of the partition walls and reduce pressure loss, the trapping efficiency may be deteriorated to a large extent. Therefore, in order to satisfy the required trapping efficiency of an engine having a reduced particulate matter amount, it is necessary to specify the proportion of the pores having a size of twice the average pore size or more to be 40% or less. Thus, by having small pores to some extent and improving permeability by large pores on the other hand, both the suppression of the pressure loss and the sufficient trapping efficiency (i.e., trapping efficiency fulfilling the required trapping efficiency) can be realized.

The lower limit of the proportion of the pores having a size of twice the average pore size or more is preferably 10% or more, more preferably 15% or more. In addition, the upper limit of the proportion of the pores having a size of twice the average pore size or more is preferably 30% or less, more preferably 25% or less. Such a configuration enables to bring a balance between an appropriate trapping efficiency and suppression of pressure loss in a good manner.

In addition, the pore size distribution of the partition wall preferably shows a distribution curve having a single peak. For example, as a method for mixing small pores and large pores, a distribution curve of two or more peaks may be possible. However, in the exhaust gas purification filter of the present embodiment, it is preferable that the pore size distribution of the partition walls shows a distribution curve having a single peak. Such a configuration enables to effectively reduce the pressure loss while trapping particulate matter by the pores of the partition walls in a good manner.

The pore size distribution of the present invention means a pore size distribution when the pore size of the partition walls measured by the mercury porosimeter is shown by a common logarithm and can be shown by, for example, a graph with a horizontal axis as a pore size (common logarithm) and a vertical axis as a log differential pore volume. The average pore size and the pore size distribution of the partition walls can be measured by a mercury porosimeter (e.g., Porosimeter 9810 (trade name) produced by Shimadzu Corporation).

In the exhaust gas purification filter of the present embodiment, the average pore size of the partition walls measured by a mercury porosimetry is 10 μm or more and 18 μm or less. By specifying the average pore size to the aforementioned range and specifying the proportion of pores having a size of twice the average pore size or more and the partition wall thickness to the predetermined numerical ranges, particulate matter in exhaust gas can be trapped in a good manner. In the case that the average pore size of the partition walls is below 10 μm, when the proportion of pores having a size of twice the average pore size or more and the partition wall thickness are specified to the aforementioned numerical ranges, pressure loss increases. In the case that the average pore size of the partition walls is above 18 μm, when the proportion of pores having a size of twice the average pore size or more and the partition wall thickness are specified to the aforementioned numerical ranges, it becomes difficult to realize the desired trapping efficiency.

The lower limit of the average pore size of the partition walls is preferably 11 μm or more, more preferably 12 μm or more. The upper limit of the average pore size of the partition walls is preferably 16 μm or less, more preferably 14 μm or less.

In the exhaust gas purification filter of the present embodiment, the partition wall thickness is 0.05 mm or more and 0.18 mm or less. The partition wall thickness is small in comparison with a conventional diesel engine filter, and the numerical range is extremely narrow. This is because the exhaust gas purification filter of the present embodiment is assumed to be a filter for an engine having a small amount of particulate matter in exhaust gas. That is, since it does not need a trapping efficiency of 99% or more as in a conventional diesel engine filter, importance is attached to the reduction of pressure loss in the partition wall thickness. For example, in order to obtain a trapping efficiency of 99% or more as in a conventional diesel engine filter with specifying the proportion of pores having a size of twice the average pore size or more and the average pore size to the predetermined numerical ranges, the partition wall thickness has to be above 0.18 mm. In the exhaust gas purification filter of the present embodiment, when the partition wall thickness is below 0.05 mm, strength of the filter falls. On the other hand, when the partition wall thickness is above 0.18 mm, the pressure loss extremely increases.

The lower limit of the partition wall thickness is preferably 0.075 mm or more, more preferably 0.1 mm or more. In addition, the upper limit of the partition wall thickness is preferably 0.15 mm or less, more preferably 0.13 mm or less.

Figure 2:
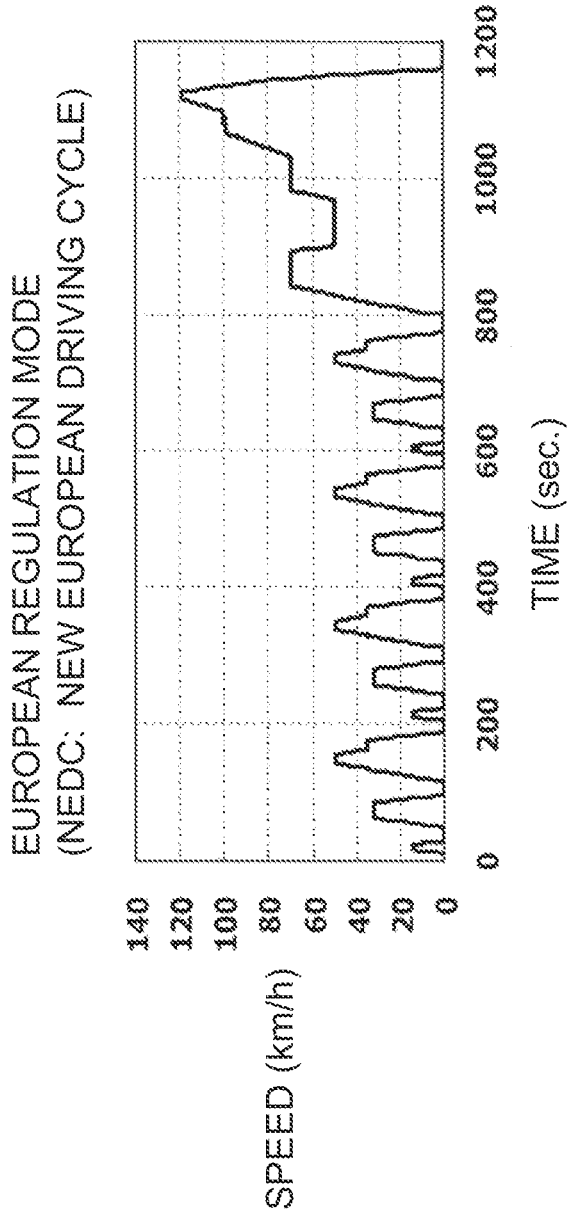
FIG. 2 is a graph showing conditions of European NEDC (New European Driving Cycle) regulation mode driving.

The exhaust gas purification filter of the present embodiment is a filter for purifying exhaust gas discharged from an engine of an automobile and can suitably be used as a filter for an engine having an exhaust gas particulate matter discharge amount of $2 \times 10^{12}$ particulates/km or less in European NEDC regulation mode driving. "NEDC" is the abbreviation of "New European Driving Cycle". The European NEDC regulation mode driving means driving under the conditions (time (sec.) and the speed (km/h)) as shown in FIG. 2. Here, FIG. 2 is a graph showing the conditions of the European NEDC regulation mode driving. The horizontal axis shows time (sec.), and the vertical axis shows speed (running speed) (km/h).

As shown in FIG. 2, in the European NEDC regulation mode driving, ECE 15 cycle is repeated 4 times, and then EUDC cycle is performed once. In the ECE 15 cycle, running conditions in an urban area are assumed (urban mode), where the maximum speed is 50 km/h and the average speed is 18.7 km/h. On the other hand, in EUDC cycle, high speed driving is assumed (high speed mode), where the maximum speed is 120 km/h and the average speed is 62.6 km/h. The NEDC regulation mode driving is performed without idling after the automobile is left out at room temperature for at least 6 hours.

The exhaust gas purification filter of the present embodiment is an exhaust gas purification filter suitably used for purification of exhaust gas, particularly, for reduction of the number of particulates finally discharged from the engine to be a predetermined number or less. That is, it is an exhaust gas purification filter suitably used for an engine having a small amount of particulate matter in exhaust gas and having an exhaust gas particulate discharge amount of $2 \times 10^{12}$ particulates/km or less in European NE DC regulation mode driving. Thus, since the exhaust gas purification filter of the present embodiment is suitably used as a filter for an engine having a small number of particulates, the trapping efficiency itself of the filter is lower than a conventional diesel engine filter.

In the exhaust gas purification filter of the present embodiment, the cell density of the honeycomb structure is preferably 13 cells/cm$^2$ or more and 70 cells/cm$^2$ or less. Such a configuration enables to suppress the rise in pressure loss with maintaining the strength of the filter. The lower limit of the cell density is preferably 15.5 cell/cm$^2$ or more. The upper limit of the cell density is preferably 42 cells/cm$^2$ or less.

In the exhaust gas purification filter of the present invention, the porosity of the partition walls is preferably 35% or more and 50% or less. Such a configuration enables to suppress the rise in pressure loss with maintaining the strength of the filter. For example, in the case that the proportion of pores having a size of twice the average pore size or more, the average pore size, and the partition wall thickness are specified to the predetermined numerical ranges, when the porosity of the partition walls is below 35%, pressure loss may increase. When the porosity of the partition walls is above 50%, strength of the filter falls. In particular, since the exhaust gas purification filter of the present embodiment has a small partition wall thickness, extremely high porosity of the partition walls is prone to cause fall of the strength. The porosity means porosity measured by mercury porosimetry.

As shown in FIG. 1, a honeycomb structure 10 used for the exhaust gas purification filter 100 of the present embodiment has porous ceramic partition walls 12 separating and forming a plurality of cells 11 functioning as exhaust gas passages and extending from one side end portion 15a to the other side end port ion 15b.

Regarding the other constituents of the honeycomb structure, constituents similar to those of a honeycomb structure used for a conventional exhaust gas purification filter may be employed as long as the proportion of pores having a size of twice the average pore size or more, the average pore size and the partition wall thickness satisfy the aforementioned numerical ranges.

There is no particular limitation on the entire shape of the honeycomb structure. For example, an ellipse, a quadrangular column, and a triangular column besides a circular column as shown in FIG. 1 may be employed.

As the shape of the cells (cell shape in a cross section perpendicular to the cell extension direction) formed in the honeycomb structure, there may be employed, for example, a hexagon, an octagon, and a triangle besides a square as shown in FIG. 1. However, the shape of the cells formed in the honeycomb structure is not limited to these shapes, and known cell shapes are widely included.

In the honeycomb structure, different cell shapes may be combined. By allowing one of adjacent cells to have an octagonal shape while allowing the other cell to have a quadrangular shape, one cell (i.e., octagonal cell) can be made larger than the other cell (i.e., quadrangular cell).

Though there is no particular limitation on the material for the honeycomb structure, ceramic is a suitable example. From the viewpoints of strength, thermal resistance, corrosion resistance, and the like, the material is preferably one of cordierite, silicon carbide, alumina, mullite, aluminum titanate, silicon nitride, and silicon-silicon carbide based composite materials formed with silicon carbide as the frameworks and metal silicon as the bonding portion-forming raw material. Of these material, cordierite is particularly preferable.

The plugging portions are disposed in open end portions on one side of predetermined cells and open end portions on the other side of the other cells of the honeycomb structure to plug one of the open end portions of the cell. As the plugging portions, plugging portions constituted in the same manner as the plugging portions used for a conventional exhaust gas purification filter can be used. The plugging portions can be formed by the use of a ceramic material similar to that for the partition walls of the honeycomb structure.

In the exhaust gas purification filter of the present embodiment, it is preferable that a checkerwise pattern is formed by the plugging portions and the open end portions of the cells on one side end face of the honeycomb structure having plugging portion disposed therein. That is, it is preferable that the cells having plugged end portions on one side and open end portions on the other side (i.e., the aforementioned predetermined cells) and the cells having open end portions on one side and plugged end portions on the other side (i.e., the other cells described above) are alternately disposed.

In the exhaust gas purification filter of the present embodiment, it is preferable that the plugging portions plugging open end portions of the cells have a length of 1 mm or more and 7 mm or less in a cell extension direction. When the length in the cell extension direction is below 1 mm, the plugging portion may easily be detached from the honeycomb structure. When the length in the cell extension direction is above 7 mm, the length of the plugging portions of the cells is extremely long, which reduces the effective area of the partition walls (in other words, the substantial length in the cell extension direction of the partition walls) for purifying exhaust gas, and thereby the purification performance of the filter may fall.

In the exhaust gas purification filter of the present embodiment, a catalyst may be loaded on the surfaces of the partition walls and on the internal surfaces of the pores formed in the partition walls. By thus loading a catalyst, combustion and removal of the particulate matter depositing on the surfaces of the partition walls can be made easier by the catalysis.

Examples of the catalyst include a ternary catalyst, a NOx purification catalyst, and an oxidation catalyst. As the ternary catalyst, there can be mentioned a catalyst obtained by loading a noble metal such as Pt, Pd, and Rh on a carrier containing alumina. or ceria as the main component. As the NOx purification catalyst, there can be mentioned a catalyst obtained by loading Pt and "Ba or K as a NOx storage component" on a carrier containing alumina as the main component, a catalyst containing "zeolite subjected to metal substitution with Fe or Cu" as the main component, and the like.

Though there is no particular limitation on the amount of the catalyst loaded, the loading amount per unit volume of the honeycomb structure (g/L) is preferably 30 g/L or less. The exhaust gas purification filter of the present embodiment aims at exhaust gas having a small particulate matter amount, and excessive loading of a catalyst may increase pressure loss. In the case that a catalyst is loaded on the partition walls of the honeycomb structure, each of the values such as the average pore size of the partition walls described above means a value obtained by measuring the partition walls of the honeycomb structure before the catalyst is loaded.

[2] Method for Manufacturing Exhaust Gas Purification Filter:

Hereinbelow, a method for manufacturing an exhaust gas purification filter of the present invention will be described. As a method for manufacturing a honeycomb structure of the present invention, in the first place, there is manufactured a honeycomb structure having porous ceramic partition walls separating and forming a plurality of cells functioning as exhaust gas passages and extending from one side end portions to the other side end portions. At this time, the partition walls of the honeycomb structure obtained satisfies the following constituents (1) to (3). (1) The partition wall thickness is 0.05 mm or more and 0.18 mm or less. (2) The average pore size of the partition walls is 10 μm or more and 18 μm or less, which is measured by mercury porosimetry. (3) The proportion of the volume of the pores having a size of twice the average pore size or more in the entire pore volume in a pore size distribution of the partition walls measured by mercury porosimetry is 5% or more and 40% or less.

The partition wall thickness can be realized by adjusting the size of the slits of the forming die for extruding forming kneaded material for manufacturing a honeycomb structure.

In addition, the average pore size and the pore size distribution of the partition walls of the honeycomb structure to be obtained can be realized by adjusting the particle diameter and compounding ratio of the ceramic raw material used for preparation of the forming kneaded material. Hereinbelow, regarding the preparation method for the forming kneaded material, the case of preparing the forming kneaded material using a cordierite-forming raw material and the case of preparing the forming kneaded material using a silicon carbide raw material will specifically be described.

In the case of preparing a forming kneaded material using a cordierite-forming raw material, a dispersion medium such as water and a pore former as desired are added t o the cordierite-forming raw material, and an organic binder and a dispersant are further added, and they are kneaded to obtain a forming kneaded material having plasticity. The cordierite-forming raw material means a raw material forming cordierite by firing. The cordierite-forming raw material is ceramic raw materials obtained by mixing "predetermined raw materials" so as to obtain a chemical composition where silica ($SiO_2$) is 42 to 56 mass %, alumina ($Al_2O_3$) is 30 to 45 mass %, and magnesia (MgO) is 12 to 16 mass %. Examples of the "predetermined raw materials" include talc, kaolin, alumina source raw material, and silica. The alumina source raw material means a raw material oxidized by firing to form a part of cordierite, such as aluminum oxide, aluminum hydroxide, and boehmite. There is no particular limitation on the method for forming the kneaded material by kneading forming raw material such as cordierite-forming raw material, and, for example, a method of using a kneader, vacuum kneader, or the like can be mentioned.

The average pore size measured by mercury porosimetry and the pore size distribution of the partition walls of the honeycomb structure obtained can be controlled by the particle diameter and compounding ratio of talc or silica used as a raw material. More specifically, the average pore size of 10 μm or more and 18 μm or less of the partition walls and the proportion of the volume of the pores having a size of twice the average pore size or more in the entire pore volume in a pore size distribution of 5% or more and 40% or less can be realized by, for example, the following method. The first method is a method of using silica having an average particle diameter of 35 μm or more. Alternatively, there is a method of using talc having an average particle diameter of 30 μm or more. By at least one of these two methods, the aforementioned average pore size and the pore size distribution can be realized. Of course, though the particle diameters and the like of the raw material particles other than silica and talc influence the average pore size and pore size distribution of the partition walls more than a little, at least one of the aforementioned two methods is particularly effective. That is, it is preferable to use an appropriate amount of at least one of the silica having an average particle diameter of 35 μm or more and the talc having an average particle diameter of 30 μm or more as a cordierite-forming raw material. By the use of such a cordierite-forming raw material, the forming kneaded material is prepared in such a manner that the average pore size of the partition walls of the resultant honeycomb structure becomes 10 μm or more and 18 μm or less to make broad the pore size distribution of the partition walls of the resultant honeycomb structure. As a result, the proportion of the volume of the pores having a size of twice the average pore size or more in the entire pore volume satisfies 5% or more and 40% or less.

In the case of preparing the forming kneaded material using a silicon carbide raw material, a dispersion medium such as water and a pore former as desired are added, and an organic binder and a dispersant are further added, followed by kneading to obtain a forming kneaded material having plasticity.

The average pore size measured by mercury porosimetry and the pore size distribution of the partition walls of the honeycomb structure obtained can be controlled by the particle diameter distribution of the silicon carbide raw material. More specifically, the average pore size of 10 μm or more and 18 μm or less of the partition walls and the proportion of the volume of the pores having a size of twice the average pore size or more in the entire pore volume in a pore size distribution of 5% or more and 40% or less can be realized by the following method. That is, in a particle diameter distribution of the silicon carbide powder as the silicon carbide raw material, it can be realized by using a raw material (silicon carbide powder) having a raw material particle diameter distribution where a logarithmic standard deviation is 0.3 μm or more when the distribution of the particle volume with respect to a logarithm of the particle diameter is taken. By preparing a forming kneaded material in such a manner that the partition walls of the resultant honeycomb structure have an average pore diameter of 10 μm or more and 18 μm or less by using a raw material having such a raw material particle diameter distribution, the partition walls of the resultant honeycomb structure obtain a broad pore size distribution. As a result, the proportion of the volume of the pores having a size of twice the average pore size or more in the entire pore volume in a pore size distribution of the partition walls measured by mercury porosimetry satisfies 5% or more and 40% or less.

Next, the forming kneaded material obtained above is formed into a predetermined shape to manufacture a honeycomb formed body. There is no particular limitation on the method for forming a honeycomb formed body by forming the forming kneaded material, and a conventionally known forming method such as extrusion or injection may be employed. A suitable example is a method where a honeycomb formed body is formed by extrusion using a die having a desired cell shape, partition wall thickness, and cell density. As a material for the die, a superhard alloy which hardly abrades is preferable.

Next, plugging portions are formed by plugging open end portions of the cells of the honeycomb formed body with slurry for forming plugging portions.

Then, the honeycomb formed body having plugging portions formed therein is fired (main firing). Calcination may be performed before firing the honeycomb formed body.

The aforementioned calcination is performed for degreasing. For example, it may be performed at 550° C. for about 3 hours in an oxidation atmosphere. The calcination is not limited to the conditions and preferably performed according to the organic matter (organic binder, dispersant, pore former, etc.) in the honeycomb formed body. Since, generally, the combustion temperature of the organic binder is about 100 to 300° C., and combustion temperature of the pore former is about 200 to 800° C., the calcination temperature may be about 200 to 1000° C. Though there is no particular limitation on the calcination time, it is generally about 3 to 100 hours.

The "firing (main firing)" means an operation for securing predetermined strength by sintering the forming raw material in the calcined body. Since the firing conditions (temperature and time) depend on the kind of forming raw material, suitable conditions may be selected according to the kind. For example, the firing temperature is generally about 1400 to 1500° C., it is not limited to this range. The calcination and the main firing may be performed separately. However, the main firing may be continuously performed after the calcination by raising the temperature.

As described above, an exhaust gas purification filter of the present invention can be manufactured. In the aforementioned manufacturing method, there is described an example of manufacturing an exhaust gas purification filter by performing the calcination and the main firing after the plugging portions for plugging open end portions of the cells are formed. However, the plugging portion may be formed after the honeycomb formed body is fired. The forming method of the plugging portions may be a method where a mask is disposed on open portions on one side of the predetermined cells to fill the plugging slurry in the open portions of the other cells. Such a method for forming plugging port ions can be performed, for example, according to a method for forming plugging portions in a known honeycomb structure.

As the raw material for the plugging portions, it is preferable to use the same raw material as that for the aforementioned honeycomb structure because the expansion coefficient upon firing can be made the same between the honeycomb structure and the plugging portions, thereby improving durability.

In the aforementioned manufacturing method, there is described an example where the honeycomb structure is unitarily extruded (i.e., unitary forming) However, for example, there may be formed a honeycomb structure of a honeycomb segment-bonded body where a plurality of honeycomb segments are bonded together.

Hereinbelow, the present invention will be described specifically on the basis of Examples. However, the present invention is by no means limited to these Examples.

EXAMPLE 1

(1) Manufacture of Exhaust Gas Purification Filter:

As the cordierite-forming raw materials, there were used alumina, aluminum hydroxide, kaolin, talc, and silica. Specifically, to 100 parts by mass of the cordierite-forming raw material were added 35 parts by mass of a dispersion medium, 6 parts by mass of an organic binder, and 0.5 part by mass of a dispersant, and they were mixed and kneaded to prepare a forming kneaded material. Water was used as the dispersion medium, hydroxypropylmethyl cellulose was used as the organic binder, and ethylene glycol was used as the dispersant.

In Example 1, the average particle diameter of talc was 20 μm, and the average particle diameter of silica was 20 μm.

The forming kneaded material prepared above was extruded to obtain a honeycomb formed body. The honeycomb formed body was dried by the use of a microwave drier and then completely dried by the use of a hot air drier. Then, both the end faces of the dried honeycomb formed body were cut to obtain a honeycomb dried body having a predetermined length. Then, after the plugging portions were formed so that adjacent cells were alternately plugged in both the end faces of the honeycomb dried body, firing at 1410 to 1440° C. for 5 hours was performed to obtain an exhaust gas purification filter.

The entire shape of the exhaust gas purification filter (in other words, the entire shape of the honeycomb structure) obtained above was circular columnar (diameter of an end faces was 118 mm, and the length in the cell extension direction was 127 mm). In addition, the porosity of the partition walls was 41%, the partition wall thickness was 0.05 mm, and the cell density was 31 cells/cm$^2$. The length of the plugging portions in the cell extension direction was 4 mm. The porosity of the partition walls was measured by mercury porosimetry. The porosity (%) of the partition walls, the partition wall thickness (mm), and the cell density (cells/cm$^2$) of the exhaust gas purification filter of Example 1 are shown in Table 1.

The average pore size of the partition walls and the pore size distribution were measured by mercury porosimetry. In the exhaust gas purification filter of Example 1, the average pore size of the partition walls measured by mercury porosimetry was 12 μm. In addition, the proportion of the volume of the pores having a size of twice the average pore size or more in the entire pore volume in a pore size distribution of the partition walls measured by mercury porosimetry (It is shown as "proportion of twice the average pore size" in Table 1) was 6%. The average pore size of the partition walls and the proportion of the pores having a size of twice the average pore size or more are shown in Table 1. The measurement by mercury porosimetry was performed by the use of Porosimeter 9810 (trade name) produced by Shimadzu Corporation. The "proportion of twice the average pore size" was calculated from the area of the graph showing the pore size distribution.

TABLE 1

| | Porosity (%) | Partition wall thickness (mm) | Average pore size (μm) | Proportion of twice the average pore size (%) | Cell density (cell/cm$^2$) | A: Initial pressure loss (ratio) | B: trapping efficiency (%) | Overall evaluation (B/A) |
|---|---|---|---|---|---|---|---|---|
| Example 1 | 41 | 0.05 | 12 | 6 | 31 | 0.9 | 80 | 89 |
| Example 2 | 41 | 0.13 | 12 | 8 | 31 | 0.8 | 80 | 100 |
| Example 3 | 41 | 0.18 | 12 | 8 | 31 | 0.8 | 80 | 100 |
| Example 4 | 41 | 0.13 | 10 | 8 | 31 | 0.8 | 80 | 100 |
| Example 5 | 41 | 0.13 | 15 | 8 | 31 | 0.8 | 80 | 100 |
| Example 6 | 41 | 0.13 | 16 | 8 | 31 | 0.8 | 80 | 100 |
| Example 7 | 41 | 0.13 | 15 | 12 | 31 | 0.6 | 75 | 125 |
| Example 8 | 41 | 0.13 | 15 | 16 | 31 | 0.6 | 74 | 123 |
| Example 9 | 41 | 0.13 | 15 | 20 | 31 | 0.6 | 73 | 122 |
| Example 10 | 41 | 0.13 | 15 | 23 | 31 | 0.6 | 72 | 120 |
| Example 11 | 41 | 0.13 | 15 | 38 | 31 | 0.5 | 70 | 140 |
| Example 12 | 41 | 0.13 | 12 | 8 | 13 | 0.7 | 70 | 100 |
| Example 13 | 41 | 0.13 | 12 | 8 | 70 | 1.1 | 85 | 77 |

TABLE 1-continued

|  | Porosity (%) | Partition wall thickness (mm) | Average pore size (μm) | Proportion of twice the average pore size (%) | Cell density (cell/cm²) | A: Initial pressure loss (ratio) | B: trapping efficiency (%) | Overall evaluation (B/A) |
|---|---|---|---|---|---|---|---|---|
| Example 14 | 41 | 0.13 | 12 | 8 | 31 | 0.8 | 70 | 88 |
| Example 15 | 41 | 0.13 | 12 | 10 | 31 | 1 | 80 | 80 |
| Comp. Ex. 1 | 41 | 0.04 | 15 | 8 | 31 | 0.75 | 40 | 53 |
| Comp. Ex. 2 | 41 | 0.19 | 15 | 8 | 31 | 1.8 | 80 | 44 |
| Comp. Ex. 3 | 41 | 0.13 | 15 | 4 | 31 | 2.2 | 80 | 36 |
| Comp. Ex. 4 | 41 | 0.13 | 15 | 45 | 31 | 0.7 | 30 | 43 |

(2) Performance Evaluation of Exhaust Gas Purification Filter:

Next, the "initial pressure loss (ratio)" and the "trapping efficiency (%)" of the exhaust gas purification filter obtained above were measured by the following methods. From the results of the "initial pressure loss (ratio) " and the "trapping efficiency (%)", "overall evaluation" of the exhaust gas purification filter was given. The results are shown in Table 1.

[Initial Pressure Loss (Ratio) ]

In the first place, the pressure loss of the exhaust gas purification filter was measured. As the specific method, in the first place, the air at room temperature was sent into the exhaust gas purification filter at a flow rate of 10 Nm³/min., and the pressure difference between the front and the back of the exhaust gas purification filter (i.e., differential pressure between the inlet side and the outlet side) was measured. Then, the ratio of the pressure difference of the exhaust gas purification filter of each Example to the pressure difference in the exhaust gas purification filter of Example 15 (i.e., ratio with the pressure difference (pressure loss) of Example 15 being regarded as 1) was obtained as the "initial pressure loss (ratio)" of each exhaust gas purification filter.

[Trapping Efficiency (%)]

A vehicle test was performed by a chassis dynamometer regarding the case of mounting the exhaust gas purification filter of each Example in the exhaust system of a passenger automobile having a 2-liter direct gasoline-injection engine and the case of not mounting the aforementioned exhaust gas purification filter. Specifically, the number of the particulates in exhaust gas in driving in the European regulation driving mode (NEDC) was measured by a measuring method along the PMP (particulate measurement protocol for European regulation). The "trapping efficiency (%)" was obtained from the ratio (ratio of the number of the particulates trapped by the exhaust gas purification filter to the total number of discharged particles).

[Overall evaluation]

The initial pressure loss (ratio) of each exhaust gas purification filter was determined as "A", and the trapping efficiency was determined as "B". The value of "B/A" was determined as the "overall evaluation" of each exhaust gas purification filter. In this overall evaluation, as the value is higher, the evaluation of the exhaust gas purification filter is higher. That is, the value of "B/A" becomes large when the initial pressure loss (ratio) is low or when the trapping efficiency (%) is high.

EXAMPLES 2 TO 15, COMPARATIVE EXAMPLES 1 TO 4

The exhaust gas purification filters were manufactured in the same manner as in the exhaust gas purification filter of Example 1 except that the partition wall thickness, average pore size, the proportion of the volume of the pores having a size of twice the average pore size or more in the entire pore volume, and the cell density were changed as shown in Table 1.

Upon preparing the forming kneaded material, the average particle diameter of talc was 20 μm, and the average particle diameter of silica was 25 μm in Examples 2 to 4 and 12 to 15. In Examples 5 and 6, the average particle diameter of talc was 25 μm, and the average particle diameter of silica was 25 μm. In Example 7, the average particle diameter of talc was 30 μm, and the average particle diameter of silica was 35 μm. In Example 8, the average particle diameter of talc was 35 μm, and the average particle diameter of silica was 35 μm. In Example 9, the average particle diameter of talc was 40 μm, and the average particle diameter of silica was 45 μm. In Example 10, the average particle diameter of talc was 45 μm, and the average particle diameter of silica was 45 μm. In Example 11, the average particle diameter of talc was 50 μm, and the average particle diameter of silica was 50 μm.

In Comparative Examples 1 and 2, the forming kneaded material prepared in the same manner as in Example 5 was used. In Comparative Example 3, the average particle diameter of talc was 20 μm, and the average particle diameter of silica was 15 μ. In Comparative Example 4, the average particle diameter of talc was 50 μm, and the average particle diameter of silica was 30 μm.

In the exhaust gas purification filters of Examples 2 to 15 and Comparative Examples 1 to 4, the "initial pressure loss (ratio)" and "trapping efficiency (%)" were measured in the same method as that for the exhaust gas purification filter of Example 1. In addition, from the measurement results of "initial pressure loss (ratio) " and "trapping efficiency (%)", "overall evaluations" of the exhaust gas purification filters were given. The results are shown in Table 1.

(Results)

As clear from the results in Table 1, the exhaust gas purification filters of Examples 1 to 15 had good results of both the "initial pressure loss (ratio) " and the "trapping efficiency (%)", and their overall evaluations were high. That is, the "initial pressure loss (ratio)" and the "trapping efficiency (%)" were well-balanced and each showed high evaluation results.

On the other hand, though each of the exhaust gas purification filters of Comparative Examples 1 and 4 showed a good evaluation result regarding the "initial pressure loss (ratio)", the "trapping efficiency (%)" was extremely low, and therefore the overall evaluation was bad. In each of the exhaust gas purification filters of Comparative Examples 2 and 3, though the "trapping efficiency (%) was good, the "initial pressure loss (ratio)" was high, and therefore the overall evaluation was bad.

From the aforementioned results, it was found that the initial pressure loss or the trapping efficiency remarkably fell when even only one of the "partition wall thickness", "average pore size", and "proportion of twice the average pore size" is out of the numerical ranges specified in the present invention. Incidentally, the "proportion of twice the average pore size" means the proportion of the volume of the pores having a size of twice the average pore size or more in the entire pore volume. Thus, it was found that filters out of the numerical ranges specified in the present invention were not suitable as the exhaust gas purification filters for specific engines.

Industrial Applicability

An exhaust gas purification filter of the present invention can be used as a filter for trapping particulate matter contained in exhaust gas discharged from an internal combustion engine and various combustion apparatuses. In particular, it can suitably be used as a filter for purifying exhaust gas having a small amount of particulate matter.

What is claimed is:

1. An exhaust gas purification filter comprising:
a honeycomb structure having porous ceramic partition walls separating and forming a plurality of cells functioning as exhaust gas passages and extending from one end portion to the other end portion; and
plugging portions disposed in one side open end portions of predetermined cells and in the other side open end portions of the other cells;
wherein the partition walls have a thickness of 0.05 mm or more and 0.18 mm or less;
wherein the partition walls have a porosity of 35% or more and 50% or less;
wherein the partition walls have an average pore size of 10 μm or more and 18 μm or less, which is measured by mercury porosimetry; and
wherein a proportion of the volume of the pores having a size of twice the average pore size or more in the entire pore volume in a pore size distribution of the partition walls measured by mercury porosimetry is 15% or more and 40% or less.

2. The exhaust gas purification filter according to claim 1, where the pore size distribution shows a distribution curve having a single peak.

3. The exhaust gas purification filter according to claim 1, which is a filter for purifying exhaust gas discharged from an automobile engine and used for an engine having an exhaust gas particulate discharge amount of $2 \times 10^{12}$ particulates/km or less in European NEDC regulation mode driving.

4. The exhaust gas purification filter according to claim 2, which is a filter for purifying exhaust gas discharged from an automobile engine and used for an engine having an exhaust gas particulate discharge amount of $2 \times 10^{12}$ particulates/km or less in European NEDC regulation mode driving.

5. The exhaust gas purification filter according to claim 1, wherein the honeycomb structure has a cell density of 13 cells/cm$^2$ or more and 70 cells/cm$^2$ or less.

6. The exhaust gas purification filter according to claim 2, wherein the honeycomb structure has a cell density of 13 cells/cm$^2$ or more and 70 cells/cm$^2$ or less.

7. The exhaust gas purification filter according to claim 3, wherein the honeycomb structure has a cell density of 13 cells/cm$^2$ or more and 70 cells/cm$^2$ or less.

8. The exhaust gas purification filter according to claim 4, wherein the honeycomb structure has a cell density of 13 cells/cm$^2$ or more and 70 cells/cm$^2$ or less.

9. The exhaust gas purification filter according to claim 1, wherein the plugging portions have a length of 1 mm or more and 7 mm or less in a cell extension direction.

10. The exhaust gas purification filter according to claim 2, wherein the plugging portions have a length of 1 mm or more and 7 mm or less in a cell extension direction.

11. The exhaust gas purification filter according to claim 3, wherein the plugging portions have a length of 1 mm or more and 7 mm or less in a cell extension direction.

12. The exhaust gas purification filter according to claim 4, wherein the plugging portions have a length of 1 mm or more and 7 mm or less in a cell extension direction.

13. The exhaust gas purification filter according to claim 5, wherein the plugging portions have a length of 1 mm or more and 7 mm or less in a cell extension direction.

14. The exhaust gas purification filter according to claim 6, wherein the plugging portions have a length of 1 mm or more and 7 mm or less in a cell extension direction.

15. The exhaust gas purification filter according to claim 7, wherein the plugging portions have a length of 1 mm or more and 7 mm or less in a cell extension direction.

16. The exhaust gas purification filter according to claim 8, wherein the plugging portions have a length of 1 mm or more and 7 mm or less in a cell extension direction.

17. The exhaust gas purification filter according to claim 1, wherein a catalyst-loaded-amount per unit volume of the honeycomb structure is 30 g/L or less.

* * * * *